United States Patent
Umehara et al.

(10) Patent No.: US 6,768,462 B2
(45) Date of Patent: Jul. 27, 2004

(54) DIVERSITY ANTENNA AND WIRELESS COMMUNICATION APPARATUS EMPLOYING IT

(75) Inventors: Naoko Umehara, Takatsuki (JP); Kenji Itagaki, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/246,544

(22) Filed: Sep. 19, 2002

(65) Prior Publication Data

US 2003/0058171 A1 Mar. 27, 2003

(30) Foreign Application Priority Data

Sep. 21, 2001 (JP) ........................................ 2001-288193

(51) Int. Cl.$^7$ ................................................ H01Q 1/24
(52) U.S. Cl. ................................ 343/700 MS; 343/846
(58) Field of Search .......................... 343/700 MS, 702, 343/846, 893

(56) References Cited

U.S. PATENT DOCUMENTS

| | | | | |
|---|---|---|---|---|
| 5,550,554 A | * | 8/1996 | Erkocevic | .................... 343/828 |
| 6,426,723 B1 | * | 7/2002 | Smith et al. | ......... 343/700 MS |
| 6,483,463 B2 | * | 11/2002 | Kadambi et al. | .... 343/700 MS |
| 6,686,886 B2 | * | 2/2004 | Flint et al. | .................. 343/702 |

FOREIGN PATENT DOCUMENTS

| JP | 10-335931 A | 12/1998 |
|---|---|---|
| JP | 2000-31721 A | 1/2000 |

* cited by examiner

*Primary Examiner*—James Clinger
(74) *Attorney, Agent, or Firm*—Nixon & Vanderhye P.C.

(57) ABSTRACT

A first and a second inverted-F antenna are arranged so that the center axes of a first and a second elongate conductor portion are substantially perpendicular to each other, that the center axes of a first and a second feeding conductor portion are substantially parallel to each other, that the first and second elongate conductor portions face outward, and that a first and a second printed circuit board are substantially parallel to each other.

24 Claims, 7 Drawing Sheets

DIVERSITY ANTENNA AND WIRELESS COMMUNICATION APPARATUS EMPLOYING IT

BACKGROUND OF THE INVENTION

1. Field of the Invention

The present invention relates to a diversity antenna, and to a wireless communication apparatus employing it.

2. Description of the Prior Art

In recent years, with the advancement of communication technology, wireless communication apparatuses have come to be made compact. One type of small-size antenna used in such wireless communication apparatuses is the inverted-F antenna. The inverted-F antenna uses an element of which the length equals ¼ of the wavelength, and permits the feed point to be located at the center of the element. Thus, the inverted-F antenna is suitable for miniaturization. By using two such inverted-F antennas, it is possible to build a diversity antenna.

FIG. 7 is an external perspective view of a conventional diversity antenna. The conventional diversity antenna 50 is composed of a plate-shaped inverted-F antenna 60 and a plate-shaped inverted-F antenna 70. The plate-shaped inverted-F antennas 60 and 70 are arranged on the top surface of a chassis 51 of a wireless communication apparatus.

The inverted-F antenna 60 is composed of a plate 61, a grounding plate 62, a feed wire 63, and a feed point 64. The inverted-F antenna 70 is composed of a plate 71, a grounding plate 72, a feed wire 73, and a feed point 74.

The plates 61 and 71 are each formed as a rectangular metal conductor, the lengths of the sides of which are determined according to the frequency used. The grounding plates 62 and 72 are also metal conductors, which serve to ground the plates 61 and 71, respectively, to the chassis 51 of the wireless communication apparatus. The feed wires 63 and 73 feed ultra-high-frequency current to the feed points 64 and 74 to excite the plates 61 and 71, respectively. The feed points 64 and 74 are where the largest amount of current can be fed to the plates 61 and 71, respectively. The chassis 51 of the wireless communication apparatus is box-shaped.

In FIG. 7, the plane that is parallel to the top surface of the chassis 51 of the wireless communication apparatus and on which the inverted-F antennas 60 and 70 are arranged is called the horizontal plate H, and the direction perpendicular to the top surface of the chassis 51 of the wireless communication apparatus is called the vertical axis V.

FIGS. 8A and 8B are diagrams showing the directivity patterns of the conventional diversity antenna 50 shown in FIG. 7 and described above. FIG. 8A is a diagram showing the directivity patterns of the inverted-F antenna 60 with respect to the vertical axis V, where the directivity pattern for vertically polarized radio waves is indicated with a solid line 80 and the directivity pattern for horizontally polarized radio waves is indicated with a broken line 81. FIG. 8B is a diagram showing the directivity patterns of the inverted-F antenna 70 with respect to the vertical axis V, where the directivity pattern for vertically polarized radio waves is indicated with a solid line 82 and the directivity pattern for horizontally polarized radio waves is indicated with a broken line 83.

The conventional structure described above, however, has the following disadvantages. The directivity patterns of the inverted-F antennas 60 and 70 with respect to the vertical axis V shown in FIGS. 8A and 8B clearly show the following. First, for vertically polarized radio waves, the inverted-F antennas 60 and 70 exhibit lower gains below the top surface of the chassis 51 of the wireless communication apparatus on which they are arranged than above that surface, and have null points in the direction of the vertical axis V. Second, the inverted-F antennas 60 and 70 exhibit lower gains for horizontally polarized radio waves as indicated with broken lines than for vertically polarized radio waves as indicated with solid lines. Thus, combining antennas of this type to build a diversity antenna does not help to overcome low gains in particular directions or on particular polarization planes. Such a diversity antenna may operate satisfactorily in applications where the system employing it is used in a fixed state or position and requires transmission and reception of radio waves polarized in a particular way, but not where the system is used in an unpredictable state or position and requires transmission and reception of radio waves polarized in any way and traveling in and from any direction.

SUMMARY OF THE INVENTION

An object of the present invention is to provide a diversity antenna free from the disadvantages mentioned above, and -to provide a wireless communication apparatus employing such a diversity antenna.

To achieve the above object, according to the present invention, the following improvements are made. The first and second antennas no longer have, in their directivity patterns with respect to the vertical axis V, null points in the direction of the vertical axis V as are observed conventionally. Thus, the first and second antennas exhibit gains in all directions, and are thus largely non-directional. Moreover, lower gains for horizontally polarized radio waves than for vertically polarized radio waves as are observed conventionally are improved. In diversity operation, the improved gains of the first and second antennas for horizontally polarized radio waves make it possible to cope satisfactorily with radio waves polarized on different polarization planes.

Specifically, according to the present invention, a diversity antenna is provided with: a first inverted-F antenna composed of a first elongate conductor portion, a first grounding conductor portion formed at one side of the first elongate conductor portion so as to be substantially perpendicular to the first elongate conductor portion, and a first feeding conductor portion formed at another side of the first elongate conductor portion so as to be substantially perpendicular to the first elongate conductor portion; and a second inverted-F antenna composed of a second elongate conductor portion, a second grounding conductor portion formed at one side of the second elongate conductor portion so as to be substantially perpendicular to the second elongate conductor portion, and a second feeding conductor portion formed at another side of the second elongate conductor portion so as to be substantially perpendicular to the second elongate conductor portion. The first and second inverted-F antennas are arranged so that the center axes of the first and second elongate conductor portions are substantially perpendicular to each other and that the center axes of the first and second feeding conductor portions are substantially parallel to each other.

Thus, according to the present invention, it is possible to reduce the differences between the gains for vertically polarized radio waves and the gain for horizontally polarized radio waves. This makes it possible to realize a diversity antenna that copes with both vertically and horizontally polarized radio waves.

According to the present invention, the first inverted-F antenna has a first printed circuit board, the first grounding conductor portion is electrically connected to the ground pattern of the first printed circuit board, and the first feeding conductor portion is electrically connected to the feed point of the first printed circuit board. On the other hand, the second inverted-F antenna has a second printed circuit board, the second grounding conductor portion is electrically connected to the ground pattern of the second printed circuit board, and the first and second printed circuit boards are arranged substantially parallel so as to face each other.

Thus, according to the present invention, the first and second antennas have no null points in the direction of the vertical axis V for either vertically or horizontally polarized radio waves, and therefore exhibit gains in all directions, i.e., are largely non-directional. In addition, the first and second antennas are arranged so that their center axes are perpendicular to each other. This makes it possible, in diversity operation, to cope satisfactorily with radio waves polarized on different polarization planes.

According to the present invention, the first and second printed circuit boards each have a perimeter equal to the wavelength of the radio waves used.

Thus, according to the present invention, the radio waves reach, by diffraction, as far as the surfaces of the first and second printed circuit boards opposite to the surfaces thereof on which the first and second elongate conductor portions are formed. This makes the directivity patterns of the first and second inverted-F antennas closer to non-directional, and thus further reduces the difference between the gain for vertically polarized radio waves and the gain for horizontally polarized radio waves.

According to the present invention, with respect to the center about which the first and second printed circuit boards are arranged so as to face each other, the surface of the first printed circuit board on which the first elongate conductor portion is formed and the surface of the second printed circuit board on which the second elongate conductor portion is formed face away from each other.

Thus, according to the present invention, even if an obstacle or the like is located between the first printed circuit board of the first inverted-F antenna and the second printed circuit board of the second inverted-F antenna, it does not seriously affect the operation of the diversity antenna.

According to the present invention, the first elongate conductor portion of the first inverted-F antenna is arranged so that the center axis thereof is substantially vertical, with the first feeding conductor portion up, and the second elongate conductor portion of the second inverted-F antenna is arranged so that the center axis thereof is substantially horizontal.

Thus, according to the present invention, the center axes of the first and second inverted-F antennas coincide with the polarization planes of vertically and horizontally polarized radio waves. This makes it possible, in diversity operation, to cope satisfactorily with radio waves polarized on different polarized planes. Moreover, the center axis of the first inverted-F antenna is arranged vertically with the first feeding conductor portion, which is connected to the feed point at which the largest amount of current flows, located up. This reduces the effects on the diversity antenna of an obstacle located under the first inverted-F antenna. That is, even when a system employing those antennas is installed on a wall or desk, its effects can be reduced.

According to the present invention, the second inverted-F antenna is arranged so that the second elongate conductor portion is located above the horizontal center axis of the second printed circuit board.

Thus, according to the present invention, the second elongate conductor portion is located above the horizontal center axis of the second printed circuit board. This reduces the effects on the diversity antenna of an obstacle located under the first inverted-F antenna. That is, even when a system employing those antennas is installed on a wall or desk, its effects can be reduced.

According to the present invention, in a wireless communication apparatus including a diversity antenna as described above and a transmitter/receiver circuit board unit connected thereto, the first and second inverted-F antennas are arranged substantially symmetrically about the transmitter/receiver circuit board unit placed between them.

Thus, according to the present invention, it is possible, inside the miniaturized wireless communication apparatus, to secure a sufficient interval between the first and second inverted-F antennas and arrange the transmitter/receiver circuit board unit between the first and second inverted-F antennas. This makes it possible to realize a wireless communication apparatus employing a diversity antenna of which the operation is not seriously affected by the transmitter/receiver circuit board unit.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
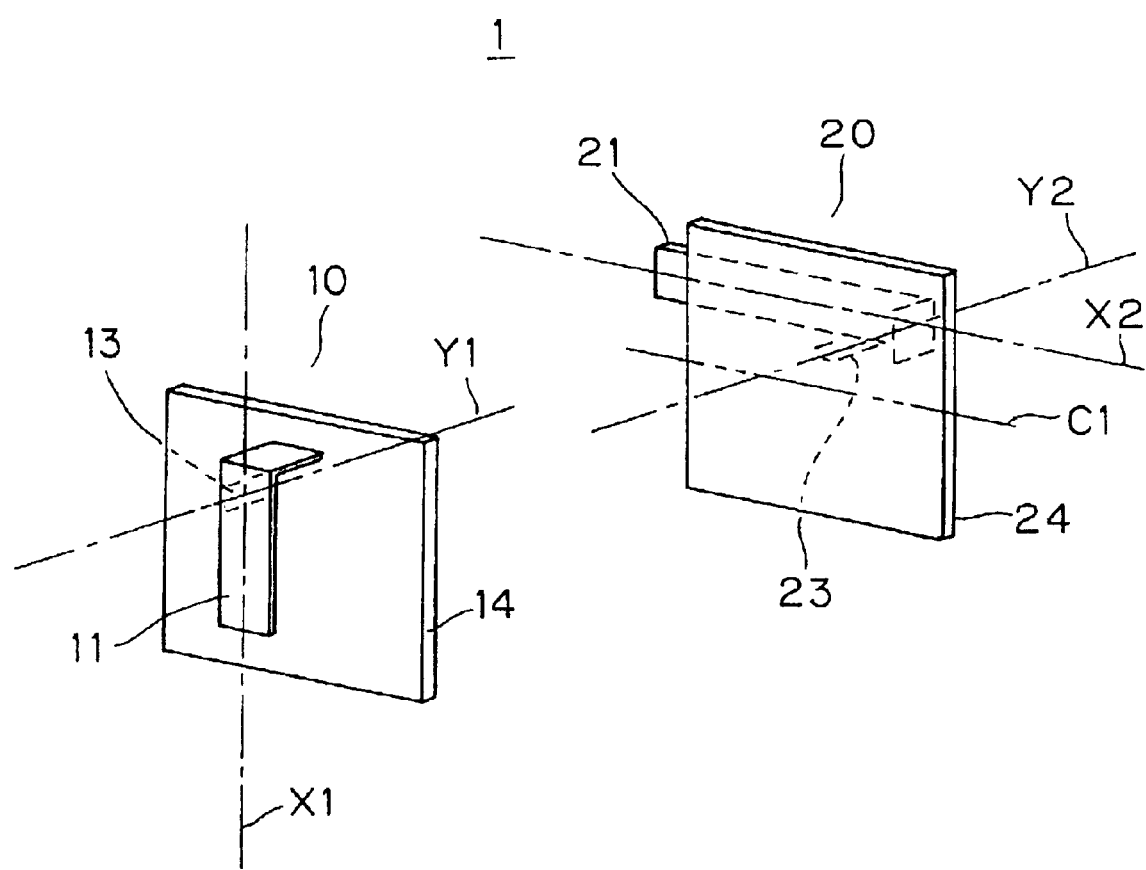
FIG. 1 is a diagram showing a diversity antenna composed of a first and a second inverted-F antenna as an embodiment of the invention.
Figure 2:
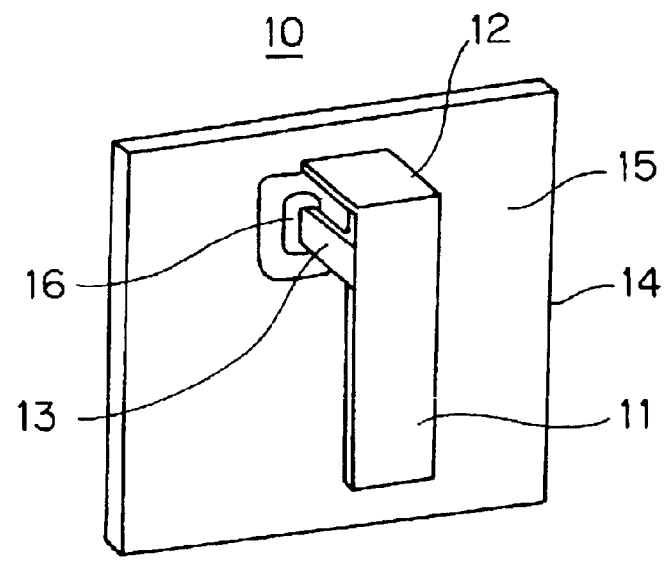
FIG. 2 is an external perspective view of the first inverted-F antenna used in the embodiment.
Figure 3:
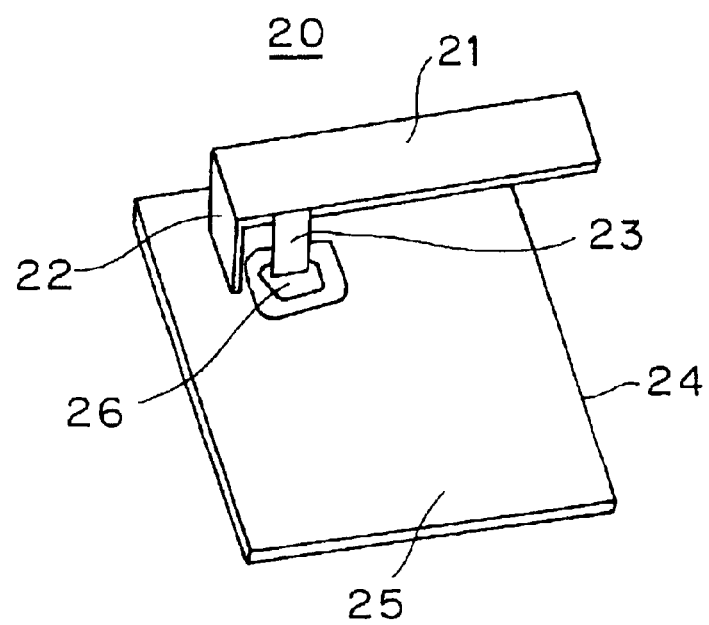
FIG. 3 is an external perspective view of the second inverted-F antenna used in the embodiment.
Figure 4A:
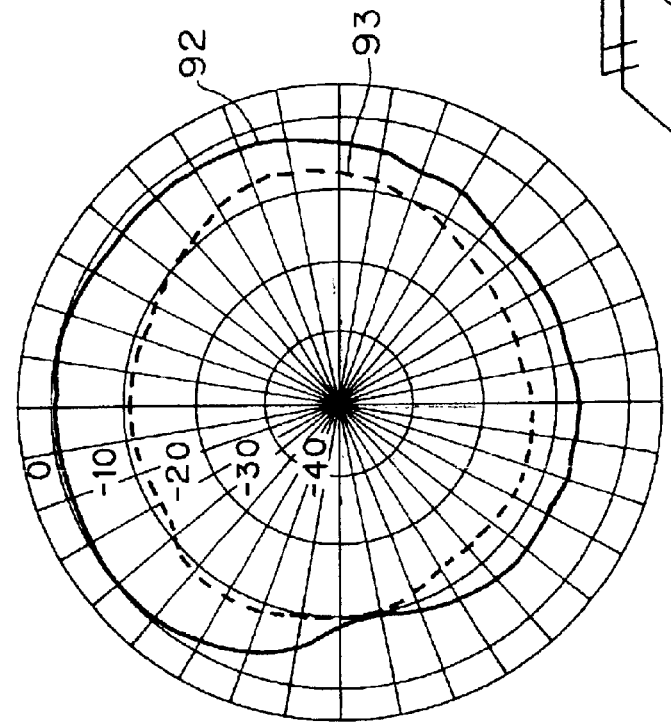
FIGS. 4A and 4B are diagrams showing the directivity patterns of the diversity antenna of the embodiment.
Figure 4B:
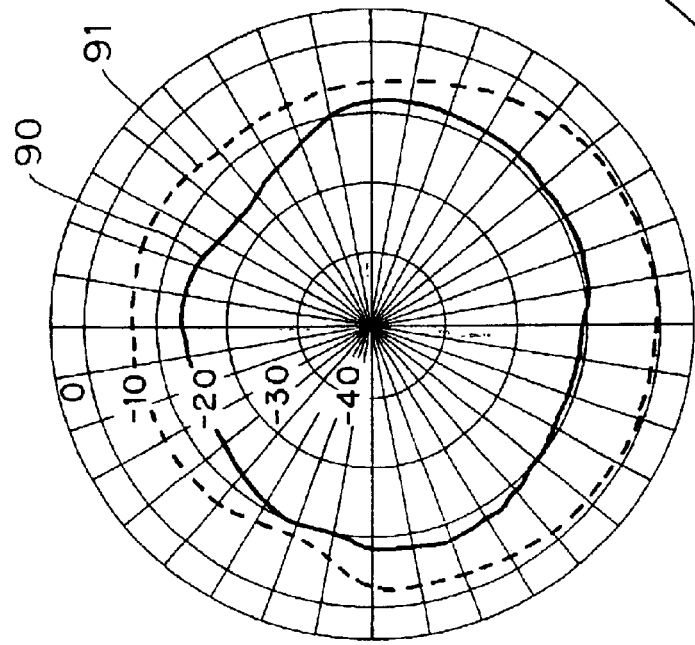

FIG. 1 is a diagram showing a diversity antenna composed of a first and a second inverted-F antenna as an embodiment of the invention. FIG. 2 is an external perspective view of the first inverted-F antenna used in the embodiment. FIG. 3 is an external perspective view of the second inverted-F antenna used in the embodiment. FIGS. 4A and 4B are diagrams showing the directivity patterns of the diversity antenna of the embodiment. Now, this embodiment of the invention will be described with reference to FIGS. 1 to 4B.

FIG. 2 is an external perspective view of the first inverted-F antenna 10 used in this embodiment. The first inverted-F antenna 10 is formed, for example, by cutting an appropriate shape out of sheet metal and then bending it into the desired shape. The first inverted-F antenna 10 is composed of a first elongate conductor portion 11, a first grounding conductor portion 12 formed at one side of the first elongate conductor portion 11 so as to be substantially perpendicular to the first elongate conductor portion 11, and a first feeding conductor portion 13 formed at another side of the first elongate conductor portion 11 so as to be substantially perpendicular to the first elongate conductor portion 11.

Moreover, the first inverted-F antenna 10 has a first printed circuit board 14 arranged so as to face the first elongate conductor portion 11. On the first printed circuit board 14 are formed a ground pattern 15 and a feed point 16. The free end of the first grounding conductor portion 12 is electrically connected to the ground pattern 15 of the first printed circuit board 14 by, for example, being soldered thereto. The free end of the first feeding conductor portion 13 is electrically connected to the feed point 16 of the first printed circuit board 14 by, for example, being soldered thereto.

The first printed circuit board 14 has a perimeter substantially equal to the wavelength of the radio waves used. For example, when the frequency used is 2.4 GHz, the perimeter of the first printed circuit board 14 is about 12 cm. Thus, when the first printed circuit board 14 is square, it measures about 3 cm wide by about 3 cm long.

In this inverted-F antenna, which usually requires a large grounding area, by giving the first printed circuit board 14 a perimeter substantially equal to the wavelength of the radio waves used, it is possible to allow the radio waves to reach, by refraction, as far as the surface of the first printed circuit board 14 opposite to the surface thereof on which the first elongate conductor portion 11 is formed. As a result, the first inverted-F antenna 10 exhibits, as shown in FIG. 4A described later, directivity patterns that expand also to the negative side of the vertical axis V and that have no null points in the direction of the vertical axis V as are observed conventionally. That is, it exhibits largely non-directional directivity patterns. In addition, the difference between the gain for vertically polarized radio waves and the gain for horizontally polarized radio waves is smaller.

As described above, in this embodiment, the first inverted-F antenna 10 is formed by cutting an appropriate shape out of sheet metal and then bending it into the desired shape. However, the first inverted-F antenna 10 may be formed in any other manner than specifically described above.

In this embodiment, the first printed circuit board 14 is square in external shape. However, the first printed circuit board 14 may be given any other shape than specifically described above, for example, a substantially rectangular or polygonal shape, or a partially modified version of such a shape.

FIG. 3 is an external perspective view of the second inverted-F antenna 20 used in this embodiment. The second inverted-F antenna 20 is formed, for example, by cutting an appropriate shape out of sheet metal and then bending it into the desired shape. The second inverted-F antenna 20 is composed of a second elongate conductor portion 21, a second grounding conductor portion 22 formed at one side of the second elongate conductor portion 21 so as to be substantially perpendicular to the second elongate conductor portion 21, and a second feeding conductor portion 23 formed at another side of the second elongate conductor portion 21 so as to be substantially perpendicular to the second elongate conductor portion 21.

Moreover, the second inverted-F antenna 20 has a second printed circuit board 24 arranged so as to face the second elongate conductor portion 21. On the second printed circuit board 24 are formed a ground pattern 25 and a feed point 26. The free end of the second grounding conductor portion 22 is electrically connected to the ground pattern 25 of the second printed circuit board 24 by, for example, being soldered thereto. The free end of the second feeding conductor portion 23 is electrically connected to the feed point 26 of the second printed circuit board 24 by, for example, being soldered thereto.

The second printed circuit board 24 has a perimeter substantially equal to the wavelength of the radio waves used. For example, when the frequency used is 2.4 GHz, the perimeter of the second printed circuit board 24 is about 12 cm. Thus, when the second printed circuit board 24 is square, it measures about 3 cm wide by about 3 cm long.

In this inverted-F antenna, which usually requires a large grounding area, by giving the second printed circuit board 24 a perimeter substantially equal to the wavelength of the radio waves used, it is possible to allow the radio waves to reach, by refraction, as far as the surface of the second printed circuit board 24 opposite to the surface thereof on which the second elongate conductor portion 21 is formed. As a result, the second inverted-F antenna 20 exhibits, as shown in FIG. 4B described later, directivity patterns that expand also to the negative side of the vertical axis V and that have no null points in the direction of the vertical axis V as are observed conventionally. That is, it exhibits largely non-directional directivity patterns. In addition, the difference between the gain for vertically polarized radio waves and the gain for horizontally polarized radio waves is smaller.

As described above, in this embodiment, the second inverted-F antenna 20 is formed by cutting an appropriate shape out of sheet metal and then bending it into the desired shape. However, the second inverted-F antenna 20 may be formed in any other manner than specifically described above.

In this embodiment, the second printed circuit board 24 is square in external shape. However, the second printed circuit board 24 may be given any other shape than specifically described above, for example, a substantially rectangular or polygonal shape, or a partially modified version of such a shape.

FIG. 1 is a diagram showing the diversity antenna 1 of this embodiment. The diversity antenna 1 is composed of the first inverted-F antenna 10 shown in FIG. 2 and the second inverted-F antenna 20 shown in FIG. 3. What has been explained about FIG. 2 applies to the first inverted-F antenna 10 here, and what has been explained about FIG. 3 applies to the second inverted-F antenna 20 here. Therefore, here, such components as are found also in FIGS. 2 and 3 are identified with the same reference numerals, and their explanations will not be repeated.

In the diversity antenna 1 shown in FIG. 1, the first and second inverted-F antennas 10 and 20 are so arranged that the center axis X1 of the first elongate conductor portion 11 of the first inverted-F antenna 10 and the center axis X2 of the second elongate conductor portion 21 of the second inverted-F antenna 20 are substantially perpendicular to each other, and that the center axis Y1 of the first feeding conductor portion 13 of the first inverted-F antenna 10 and the center axis Y2 of the second feeding conductor portion 23 of the second inverted-F antenna 20 are substantially parallel to each other.

Moreover, the first printed circuit board 14 arranged so as to face the first elongate conductor portion 11 of the first inverted-F antenna 10 and the second printed circuit board 24 arranged so as to face the second elongate conductor portion 21 of the second inverted-F antenna 20 are arranged substantially parallel so as to face each other.

Moreover, with respect to the center about which the first printed circuit board 14 of the first inverted-F antenna 10 and the second printed circuit board 24 of the second inverted-F antenna 20 are arranged so as to face each other, the surface of the first printed circuit board 14 on which the first elongate conductor portion 11 is formed and the surface of the second printed circuit board 24 on which the second elongate conductor portion 21 is formed are arranged so as to face away from each other.

Moreover, the first inverted-F antenna 10 is so arranged that the center axis X1 of the first elongate conductor portion 11 thereof is substantially vertical, with the first feeding conductor portion 13 up, and the second inverted-F antenna 20 is so arranged that the center axis X2 of the second elongate conductor portion 21 thereof is substantially horizontal.

Moreover, the second inverted-F antenna 20 is so arranged that the second elongate conductor portion 21 thereof is located above the horizontal center axis C1 of the second printed circuit board 24.

FIGS. 4A and 4B are diagrams showing the directivity patterns of the diversity antenna 1 of this embodiment. FIG. 4A shows the directivity patterns of the first inverted-F antenna 10 shown in FIG. 2 with respect to the vertical axis V, as observed when it is so arranged that the first printed circuit board 14 is horizontal, with the first elongate conductor portion 11 located below the first printed circuit board 14. In this figure, the directivity pattern for vertically polarized radio waves is indicated with a solid line 90, and the directivity pattern for horizontally polarized radio waves is indicated with a broken line 91. FIG. 4B shows the directivity patterns of the second inverted-F antenna 20 shown in FIG. 3 with respect to the vertical axis V, as observed when it is so arranged that the second printed circuit board 24 is horizontal, with the second elongate conductor portion 21 located above the second printed circuit board 24. In this figure also, the directivity pattern for vertically polarized radio waves is indicated with a solid line 92, and the directivity pattern for horizontally polarized radio waves is indicated with a broken line 93.

Figures 8A, 8B:
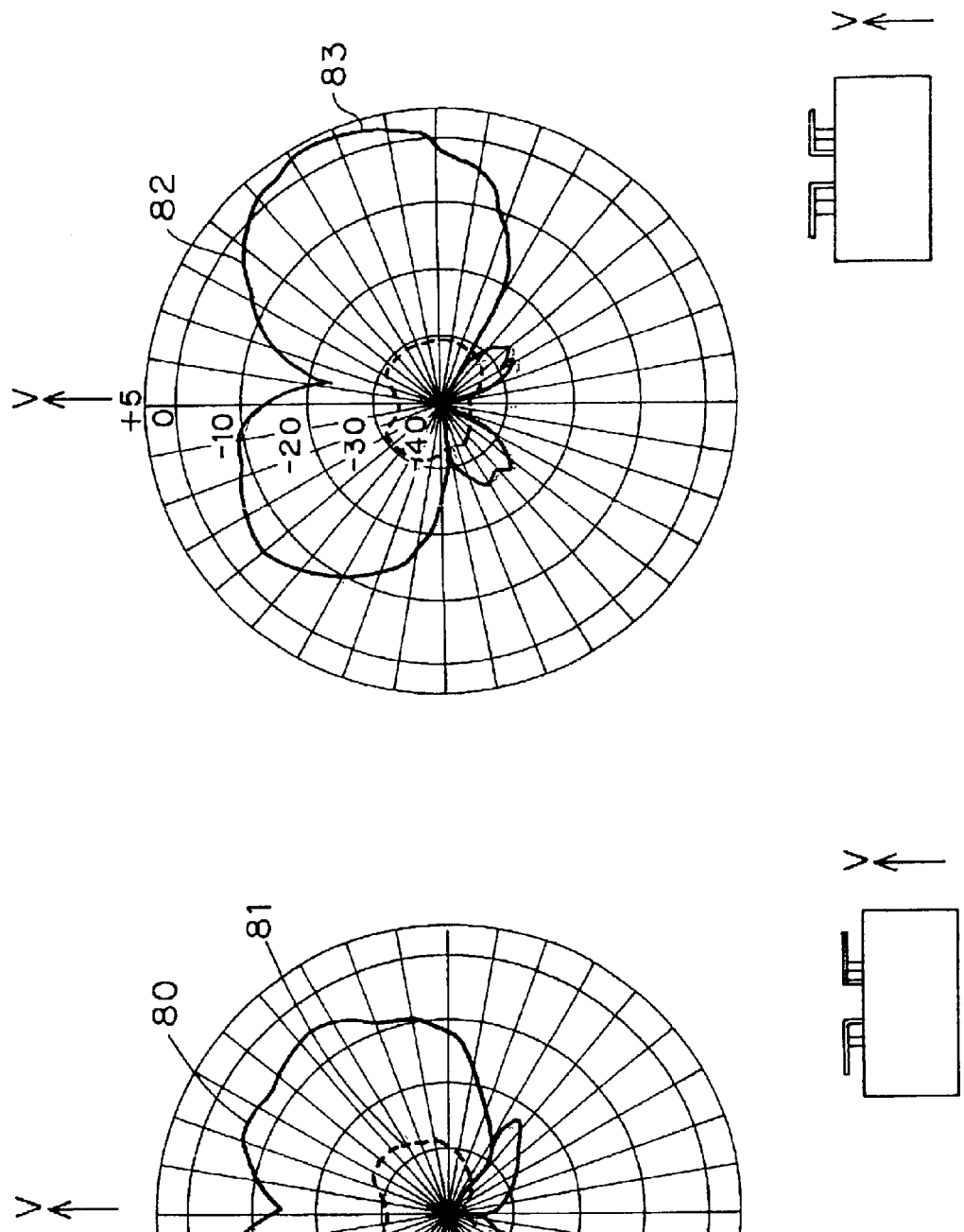
FIGS. 8A and 8B are diagrams showing the directivity patterns of the conventional diversity antenna.

Now, FIGS. 8A and 8B showing the directivity patterns of the conventional diversity antenna 50 will be compared with FIGS. 4A and 4B showing the directivity patterns of the diversity antenna 1 of this embodiment. The directivity patterns of the conventional inverted-F antennas 60 and 70 shown in FIGS. 8A and 8B show the following. First, for vertically polarized radio waves, the inverted-F antennas 60 and 70 exhibit lower gains below the top surface of the chassis 51 of the wireless communication apparatus on which they are arranged than above that surface, and have null points in the direction of the vertical axis V. Second, the inverted-F antennas 60 and 70 exhibit lower gains for horizontally polarized radio waves as indicated with broken lines than for vertically polarized radio waves as indicated with solid lines.

By contrast, FIG. 4A, which shows the directivity patterns of the first inverted-F antenna 10 of this embodiment as observed when it is so arranged that the first printed circuit board 14 is horizontal with the first elongate conductor portion 11 located below the first printed circuit board 14, shows the following. There is no striking difference between the gains above and below the first printed circuit board 14 for either vertically or horizontally polarized radio waves. Moreover, no null points are observed in the direction of the vertical axis V. Thus, the first inverted-F antenna 10 exhibits gains in all directions, and is thus largely non-directional. Furthermore, the difference between the gain for vertically polarized radio waves as indicated with a solid line and the gain for horizontally polarized radio waves as indicated with a broken line is smaller than that observed conventionally.

Likewise, FIG. 4B, which shows the directivity patterns of the second inverted-F antenna 20 of this embodiment as observed when it is so arranged that the second printed circuit board 24 is horizontal with the second elongate conductor portion 21 located above the second printed circuit board 24, shows the following. There is no striking difference between the gains above and below the second printed circuit board 24 for either vertically or horizontally polarized radio waves. Moreover, no null points are observed in the direction of the vertical axis V. Thus, the second inverted-F antenna 20 exhibits gains in all directions, and is thus largely non-directional. Furthermore, the difference between the gain for vertically polarized radio waves as indicated with a solid line and the gain for horizontally polarized radio waves as indicated with a broken line is smaller than that observed conventionally.

Moreover, whereas the gain for vertically polarized radio waves is higher than that for horizontally polarized radio waves in FIG. 4A, the opposite is true in FIG. 4B. That is, each of the two antennas copes better with radio waves polarized on a different polarization plane. Thus, in diversity operation, the two antennas cope satisfactorily with radio waves polarized on different polarization planes.

Figure 5:
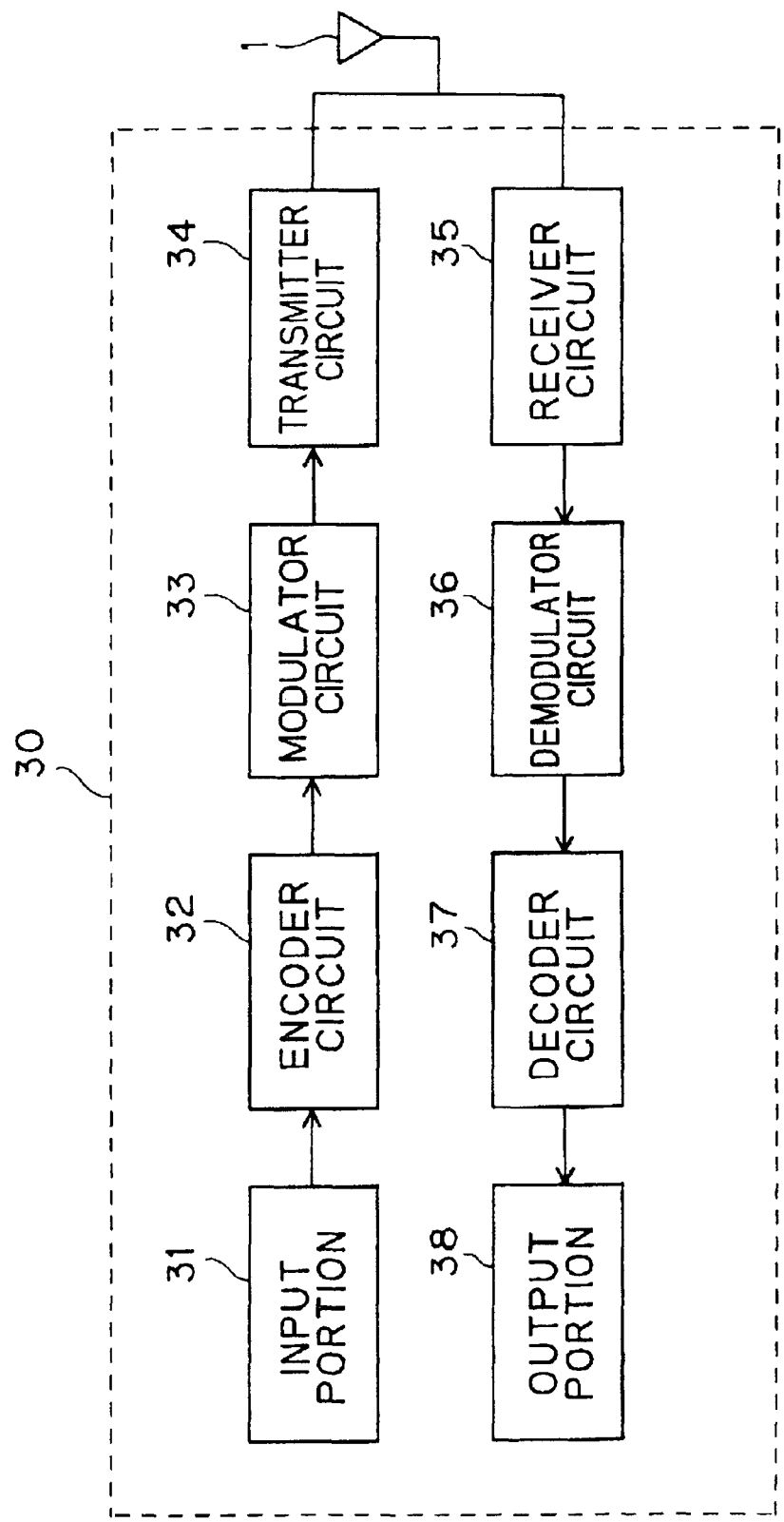
FIG. 5 is a block diagram showing the internal circuit configuration of a wireless communication apparatus as an embodiment of the invention.
Figure 6:
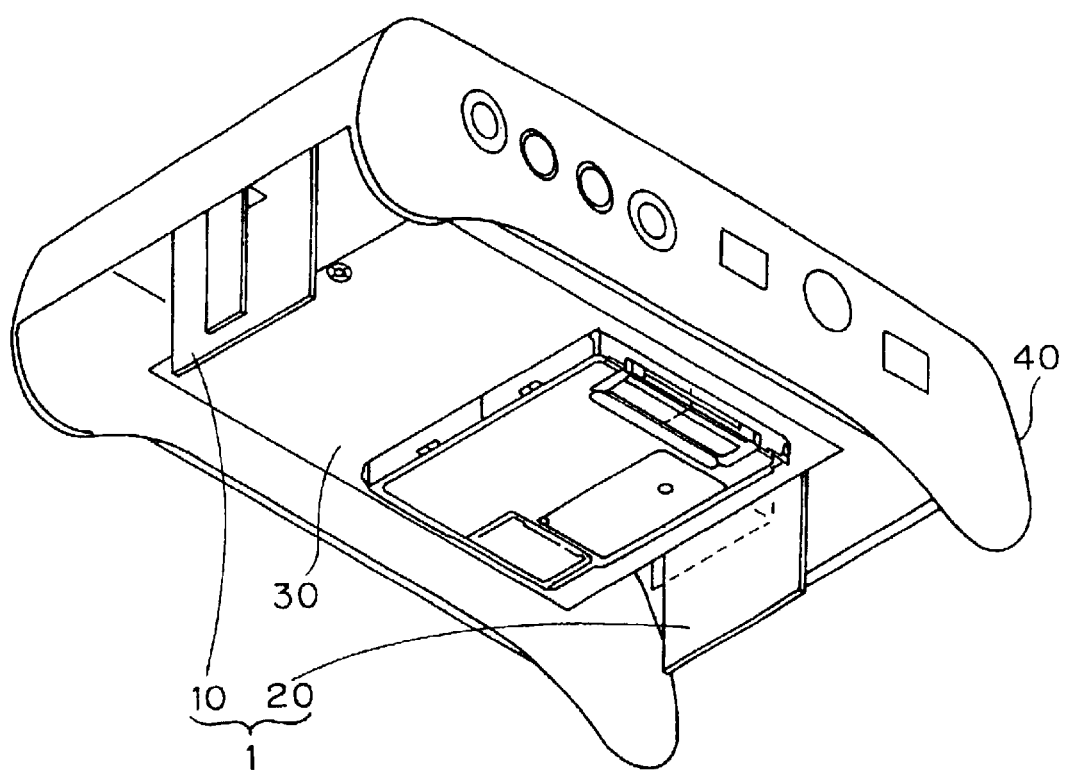
FIG. 6 is a perspective view showing how the diversity antenna is housed inside the wireless communication apparatus of the embodiment.
Figure 7:
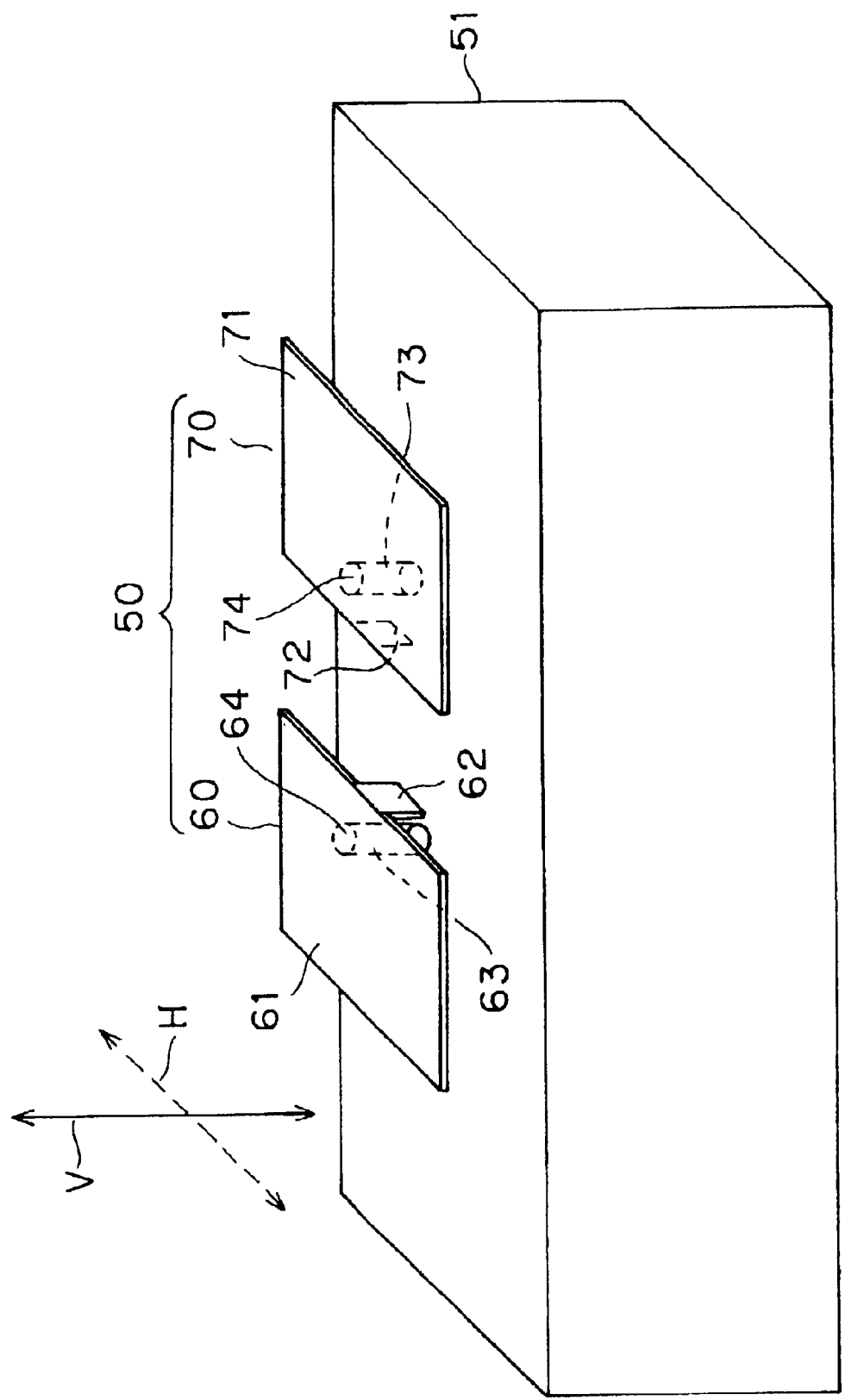
FIG. 7 is an external perspective view of a conventional diversity antenna.

FIG. 5 is a block diagram showing the internal circuit configuration of a wireless communication apparatus as an embodiment of the invention. FIG. 6 is a perspective view showing how a diversity antenna is housed in the wireless communication apparatus of this embodiment. Now, this embodiment of the invention will be described with reference to FIGS. 5 and 6.

FIG. 5 is a block diagram showing the internal circuit configuration of the wireless communication apparatus 2 of this embodiment. The wireless communication apparatus 2 shown in FIG. 5 has the following circuit configuration. The wireless communication apparatus 2 is composed of a diversity antenna 1 and a transmitter/receiver circuit board unit 30. The transmitter/receiver circuit board unit 30 is composed of an input portion 31, an encoder circuit 32, a modulator circuit 33, a transmitter circuit 34, a receiver circuit 35, a demodulator circuit 36, a decoder circuit 37, and an output portion 38.

The input portion 31 is connected to the input of the encoder circuit 32. The output of the encoder circuit 32 is connected to the input of the modulator circuit 33. The output of the modulator circuit 33 is connected to the input of the transmitter circuit 34. The output of the transmitter circuit 34 is connected to the diversity antenna 1. The diversity antenna 1 is connected also to the input of the receiver circuit 35. The output of the receiver circuit 35 is connected to the input of the demodulator circuit 36. The output of the demodulator circuit 36 is connected to the input of the decoder circuit 37. The output of the decoder circuit 37 is connected to the output portion 38.

Next, the operation of the wireless communication apparatus 2 of this embodiment shown in FIG. 5 will be described. The image or sound data fed in through the input portion 31 is encoded by the encoder circuit 32. The encoded data signal is modulated by the modulator circuit 33 with a carrier wave having a predetermined frequency (for example, in the 2.4 GHz band), is then amplified by the transmitter circuit 34, and is then radiated as a transmitted signal from the diversity antenna 1.

On the other hand, the signals received by the diversity antenna 1 are amplified by the receiver circuit 35, and are then filtered by an unillustrated filter circuit or the like provided in the receiver circuit 35 so that only the signal in a predetermined frequency band (for example, 2.4 GHz) is fed to the demodulator circuit 36. The signal from the receiver circuit 35 is detected by the demodulator circuit 36 and is thereby demodulated. The demodulated signal is then decoded by the decoder circuit 37 back into image or sound data, which is then fed out through the output portion 38.

FIG. 6 is a perspective view showing how the diversity antenna 1 is housed inside the wireless communication apparatus 2 of this embodiment.

The wireless communication apparatus 2 shown in FIG. 6 is composed of the diversity antenna 1 shown in FIG. 1, the transmitter/receiver circuit board unit 30 connected thereto and having the circuit configuration shown in FIG. 5, and a cabinet 40.

FIG. 6 shows how the diversity antenna 1 and the transmitter/receiver circuit board unit 30 are housed inside the cabinet 40 as seen from below the wireless communication apparatus 2. To permit the view inside, part of the cabinet 40 (an unillustrated bottom part thereof) is removed.

The first inverted-F antenna 10 shown in FIG. 2 and the second inverted-F antenna 20 shown in FIG. 3, which together constitute the diversity antenna 1 shown in FIG. 1, are arranged substantially symmetrically about the transmitter/receiver circuit board unit 30 placed between them.

Here, the first inverted-F antenna 10 shown in FIG. 2 and the second inverted-F antenna 20 shown in FIG. 3, which together constitute the diversity antenna 1 shown in FIG. 1, are arranged just as described earlier in connection with the diversity antenna 1 shown in FIG. 1, and therefore the explanations of their arrangement will not be repeated.

The embodiment described above deals with a case where the wireless communication apparatus 2 is capable of both transmission and reception. It is to be understood, however, that the present invention is applicable also to wireless communication apparatuses capable of transmission alone or reception alone.

What is claimed is:
1. A diversity antenna comprising:
    a first inverted-F antenna comprising:
        a first elongate conductor portion;
        a first grounding conductor portion formed at one side of the first elongate conductor portion so as to be substantially perpendicular to the first elongate conductor portion; and
        a first feeding conductor portion formed at another side of the first elongate conductor portion so as to be substantially perpendicular to the first elongate conductor portion; and
    a second inverted-F antenna comprising:
        a second elongate conductor portion;
        a second grounding conductor portion formed at one side of the second elongate conductor portion so as to be substantially perpendicular to the second elongate conductor portion; and
        a second feeding conductor portion formed at another side of the second elongate conductor portion so as to be substantially perpendicular to the second elongate conductor portion,
    the first and second inverted-F antennas being arranged so that center axes of the first and second elongate conductor portions are substantially perpendicular to each others, and so that center axes of the first and second feeding conductor portions are substantially parallel to each other, and so that the first and second elongate conductor portions face in opposite directions.

2. A diversity antenna as claimed in claim 1,
    wherein the first inverted-F antenna further comprises a first printed circuit board, the first grounding conductor portion being electrically connected to a ground pattern of the first printed circuit board, the first feeding conductor portion being electrically connected to a feed point of the first printed circuit board, and
    the second inverted-F antenna further comprises a second printed circuit board, the second grounding conductor portion being electrically connected to a ground pattern of the second printed circuit board, the first and second printed circuit boards being arranged substantially parallel so as to face each other.

3. A diversity antenna as claimed in claim 2,
    wherein the first and second printed circuit boards each have a perimeter substantially equal to a wavelength of a radio wave used.

4. A diversity antenna as claimed in claim 2,
    wherein, with respect to a center about which the first and second printed circuit boards are arranged so as to face each other, a surface of the first printed circuit board on which the first elongate conductor portion is formed and a surface of the second printed circuit board on which the second elongate conductor portion is formed face away from each other.

5. A diversity antenna as claimed in claim 2,
    wherein the first elongate conductor portion of the first inverted-F antenna is arranged so that the center axis thereof is substantially vertical, with the first feeding conductor portion up, and the second elongate conductor portion of the second inverted-F antenna is arranged so that the center axis thereof is substantially horizontal.

6. A diversity antenna as claimed in claim 2,
    wherein the second inverted-F antenna is arranged so that the second elongate conductor portion is located above a horizontal center axis of the second printed circuit board.

7. A wireless communication apparatus including a diversity antenna and a transmitter/receiver circuit board unit connected thereto,
    wherein the diversity antenna comprises:
        a first inverted-F antenna comprising:
            a first elongate conductor portion;
            a first grounding conductor portion formed at one side of the first elongate conductor portion so as to be substantially perpendicular to the first elongate conductor portion; and
            a first feeding conductor portion formed at another side of the first elongate conductor portion so as to be substantially perpendicular to the first elongate conductor portion; and
        a second inverted-F antenna comprising:
            a second elongate conductor portion;
            a second grounding conductor portion formed at one side of the second elongate conductor portion so as to be substantially perpendicular to the second elongate conductor portion; and a second feeding conductor portion formed at another side of the second elongate conductor portion so as to be substantially perpendicular to the second elongate conductor portion, the first and second inverted-F antennas being arranged so that center axes of the first and second elongate conductor portions are substantially perpendicular to each other, and so that center axes of the first and second feeding conductor portions are substantially parallel to each other, and so that the first and second elongate conductor portions face in opposite directions.

8. A wireless communication apparatus as claimed in claim 7, wherein the first inverted-F antenna further comprises a first printed circuit board, the first grounding conductor portion being electrically connected to a ground pattern of the first printed circuit board, the first feeding conductor portion being electrically connected to a feed point of the first printed circuit board, and the second inverted-F antenna further comprises a second printed circuit board, the second grounding conductor portion being electrically connected to a ground pattern of the second printed circuit board, the first and second printed circuit boards being arranged substantially parallel so as to face each other.

9. A wireless communication apparatus as claimed in claim 8, wherein the first and second printed circuit boards each have a perimeter substantially equal to a wavelength of a radio wave used.

10. A wireless communication apparatus as claimed in claim 8, wherein, with respect to a center about which the first and second printed circuit boards are arranged so as to face each other, a surface of the first printed circuit board on which the first elongate conductor portion is formed and a surface of the second printed circuit board on which the second elongate conductor portion is formed face away from each other.

11. A wireless communication apparatus as claimed in claim 8, wherein the first elongate conductor portion of the first inverted-F antenna is arranged so that the center axis thereof is substantially vertical, with the first feeding conductor portion up, and the second elongate conductor portion of the second inverted-F antenna is arranged so that the center axis thereof is substantially horizontal.

12. A wireless communication apparatus as claimed in claim 8, wherein the second inverted-F antenna is arranged so that the second elongate conductor portion is located above a horizontal center axis of the second printed circuit board.

13. A diversity antenna comprising:

a first inverted-F antenna comprising a first elongate conductor portion, a first grounding conductor portion, a first feeding conductor portion, and a first circuit board including a ground to which the first grounding conductor portion is coupled and a feed point to which the first feeding conductor portion is coupled; and a second inverted-F antenna comprising a second elongate conductor portion, a second grounding conductor portion, a second feeding conductor portion, and a second circuit board including a ground to which the second grounding conductor portion is coupled and a feed point to which the second feeding conductor portion is coupled, wherein the first and second inverted-F antennas are arranged so that center axes of the first and second elongate conductor portions are substantially perpendicular to each other and so that center axes of the first and second feeding conductor portions are substantially parallel to each other, and wherein the first and second circuit boards each have a perimeter substantially equal to a wavelength of a radio wave used.

14. A diversity antenna as claimed in claim 13, wherein the surface of the first circuit board on which the first elongate conductor portion is formed faces away from the surface of the second circuit board on which the second elongate conductor portion is formed.

15. A diversity antenna as claimed in claim 13, wherein the center axis of the first elongate conductor portion is substantially vertical and the center axis of the second elongate conductor portion is substantially horizontal.

16. A diversity antenna as claimed in claim 15, wherein the second elongate conductor portion is arranged above the horizontal center axis of the second circuit board.

17. A diversity antenna as claimed in claim 13, wherein the first and second antennas are formed from bent sheet metal.

18. A diversity antenna as claimed in claim 13, wherein each of the first and second circuit boards have a perimeter of about 12 cm.

19. A wireless communication device comprising wireless communication circuitry and a diversity antenna as claimed in claim 13.

20. A wireless communication device as claimed in claim 19, further comprising:

a housing housing the wireless communication circuitry and the diversity antenna.

21. A wireless communication device as claimed in claim 19, wherein the wireless communication circuitry comprise a wireless receiver.

22. A wireless communication device as claimed in claim 19, wherein the wireless communication circuitry comprises a wireless transmitter.

23. A wireless communication device as claimed in claim 19, wherein the wireless communication circuitry comprises a wireless transmitter/receiver.

24. A wireless communication device according to claim 19, wherein the wireless communication circuitry is mounted on a third circuit board and the first and second inverted-F antennas of the diversity antenna are arranged substantially symmetrically with respect to the third circuit board.

* * * * *